(12) United States Patent
Bent

(10) Patent No.: US 10,311,084 B2
(45) Date of Patent: Jun. 4, 2019

(54) METHOD AND SYSTEM FOR CONSTRUCTING A CLASSIFIER

(75) Inventor: Graham Anthony Bent, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 3217 days.

(21) Appl. No.: 11/550,583

(22) Filed: Oct. 18, 2006

(65) Prior Publication Data

US 2007/0124300 A1 May 31, 2007

(30) Foreign Application Priority Data

Oct. 22, 2005 (GB) ...................................... 0521552

(51) Int. Cl.
*G06F 16/28* (2019.01)
*G06N 5/04* (2006.01)
*G06N 20/00* (2019.01)

(52) U.S. Cl.
CPC ............. *G06F 16/285* (2019.01); *G06N 5/04* (2013.01); *G06N 20/00* (2019.01)

(58) Field of Classification Search
CPC ......... G06F 16/285; G06N 5/04; G06N 20/00
USPC .......................................................... 707/5
See application file for complete search history.

(56) References Cited

U.S. PATENT DOCUMENTS

| | | | |
|---|---|---|---|
| 5,796,924 A * | 8/1998 | Errico et al. .................... 706/25 |
| 6,553,365 B1 * | 4/2003 | Summerlin et al. | |
| 6,711,585 B1 * | 3/2004 | Copperman et al. | |
| 6,823,323 B2 * | 11/2004 | Forman et al. .................. 706/20 |
| 6,907,436 B2 * | 6/2005 | Ye et al. ......................... 707/203 |
| 7,028,250 B2 * | 4/2006 | Ukrainczyk et al. ......... 715/202 |
| 7,287,012 B2 * | 10/2007 | Corston et al. .................. 706/12 |
| 2002/0078091 A1 * | 6/2002 | Vu et al. ........................ 707/513 |
| 2002/0174088 A1 * | 11/2002 | Liu et al. ........................... 707/1 |
| 2005/0015454 A1 * | 1/2005 | Goodman et al. ............ 709/207 |
| 2006/0026114 A1 * | 2/2006 | Gregoire et al. .................. 707/1 |

OTHER PUBLICATIONS

Basu et al "Recommendation as Classification: Using Social and Conte-tBased Information in Recommendation" IEEE 1998 [Online] Downloaded Feb. 4, 2016 http://www.aaai.org/Papers/AAAI/1998/AAAI98-101.pdf.*

Gutierrez-Osuna, Ricardo "Lecture 13: Validation" Verified by wayback machine to 2003 [Online] Downloaded Jul. 11, 2016 https://web.archive.org/web/20030711175500/http://research.cs.tamu.edu/prism/lectures/iss/iss_l13.pdf.*

* cited by examiner

*Primary Examiner* — Ben M Rifkin
(74) *Attorney, Agent, or Firm* — Steven M. Greenberg, Esq.; Shutts & Bowen LLP

(57) ABSTRACT

A method and system for constructing a classifier for a set of records to be classified (108) into predicted classes (351-353) are provided. The set of records that are to be classified (108) are clustered into a plurality of clusters. A first classifier (106) is created that classifies records into the plurality of clusters (321-323) and the first classifier (106) is applied to a set of training records (110), each of the training records (331-334) having a predicted class (306). A classifier (107A-C) may then be created for each sub-set of training records (341-343) classed into each of the plurality of clusters and the classifier (107A-C) applied to a sub-set of records to be classified (311-313) formed in the corresponding cluster.

9 Claims, 4 Drawing Sheets

METHOD AND SYSTEM FOR CONSTRUCTING A CLASSIFIER

The present invention relates to the field of constructing a classifier. In particular, the present invention relates to constructing a classifier with reference to the context in which it is to be applied.

A classifier is a data mining system used to classify data records into specific categories. Classifiers are used in a wide range of applications, for example, from classifying customers in retail applications to classifying aircraft in defence applications. The traditional method used to construct a classifier is to use a training set of example records from which the decision boundaries are determined that separate the data records into different classes. The classifier is then applied to previously unseen records (for example, new customers) and the record is classified, usually with a statistical measure of the level of confidence that the record is in the class.

The challenge is to build a classifier from the training example records, that best generalizes the decision boundaries such that the classifier can be used in any context. This is often non-trivial since there are usually many classifiers that could be generated from the same training example records. Indeed, many data mining vendors claim that it is necessary to use a wide range of different classification techniques to ensure that the best possible classification results are obtained.

In many cases, if the actual class of the previously unseen records had been known a priori, a different and better classifier would have been constructed. This observation is true even in the case where the records to be classified are identical to example records within the training set. The reason for this apparent contradiction is simply that there are many contexts in which the training example records exist but when the classifier is applied it is usually in a specific context.

As a simple example, when it is a hot day customer behaviour may be different than when it is cold; however, the training example records do not record the temperature. A classifier built on all training example records would be different from one constructed only on records collected when it is a hot day. In general, it is not possible to discover the different contexts under which the sample example records are measured since in many cases the factors are unknown or are simply not easily measurable.

The problem of requiring context to construct an accurate classifier is understood in the prior art and known techniques used to address the problem are based on analysis of the training data, for example, by using gaussian mixture models.

The invention solves this problem by inverting the way in which the classifier is constructed using information contained in the records to be classified to determine the context, whilst still making full use of relevant training example records. In the context in which the classifier is to be used, there are a number of records to be classified. The records include examples from different possible classes.

According to a first aspect of the present invention there is provided a method of constructing a classifier for a set of records to be classified into predicted classes, comprising the steps of: a) clustering a set of records that are to be classified into a plurality of clusters, b) creating a first classifier that classifies records into the plurality of clusters; and c) applying the first classifier to a set of training records, each of the training records having a predicted class.

Step c) may classify the training records into the plurality of clusters. The method may include a further step of d) creating a classifier for each sub-set of training records classed into each of the plurality of clusters. The method may further include the step of, e) applying a classifier created for a sub-set of training records to a sub-set of records to be classified formed in step a) for the corresponding cluster.

The records to be classified may be labelled with a cluster identifier at step a). The records to be classified in a given sub-set may be labelled with the same cluster identifier. The training records may be labelled with a cluster identifier at step c). The training records in a given sub-set may be labelled with the same cluster identifier.

According to a second aspect of the present invention there is provided a system for constructing a classifier for a set of records to be classified into predicted classes, comprising: a clustering means to group a set of records that are to be classified into a plurality of clusters, a first classifier that classifies records into the plurality of clusters; and a set of training records, each of the training records having a predicted class; wherein the first classifier is applied to the set of training records.

The first classifier may classify the training records into the plurality of clusters. The system may include a classifier for each sub-set of training records classed into each of the plurality of clusters. The classifier for a sub-set of training records may be applied to a sub-set of records to be classified grouped in a cluster by the clustering means.

The clustering means may label the records to be classified with a cluster identifier. The first classifier may label the training records with a cluster identifier.

According to a third aspect of the present invention there is provided a computer program product stored on a computer readable storage medium, comprising computer readable program code means for performing the steps of: a) clustering a set of records that are to be classified into a plurality of clusters; b) creating a first classifier that classifies records into the plurality of clusters; and c) applying the first classifier to a set of training records, each of the training records having a predicted class.

The computer program product may include the step of: d) creating a classifier for each sub-set of training records classed into each of the plurality of clusters. The computer program product may further include the step of: e) applying a classifier created for a sub-set of training records to a sub-set of records to be classified formed in step a) for the corresponding cluster.

According to a fourth aspect of the present invention there is provided a method of providing a service to a customer over a network, comprising: a) clustering a set of records that are to be classified into a plurality of clusters; b) creating a first classifier that classifies records into the plurality of clusters; c) applying the first classifier to a set of training records, each of the training records having a predicted class.

The method of providing a service to a customer may include the step of: d) creating a classifier for each sub-set of training records classed into each of the plurality of clusters. The method of providing a service to a customer may further include the step of: e) applying a classifier created for a sub-set of training records to a sub-set of records to be classified formed in step a) for the corresponding cluster.

Embodiments of the present invention with now be described, by way of examples only, with reference to the accompanying drawings in which.

An example embodiment of a data processing system is provided for practising the described data classification method.

Figure 1:
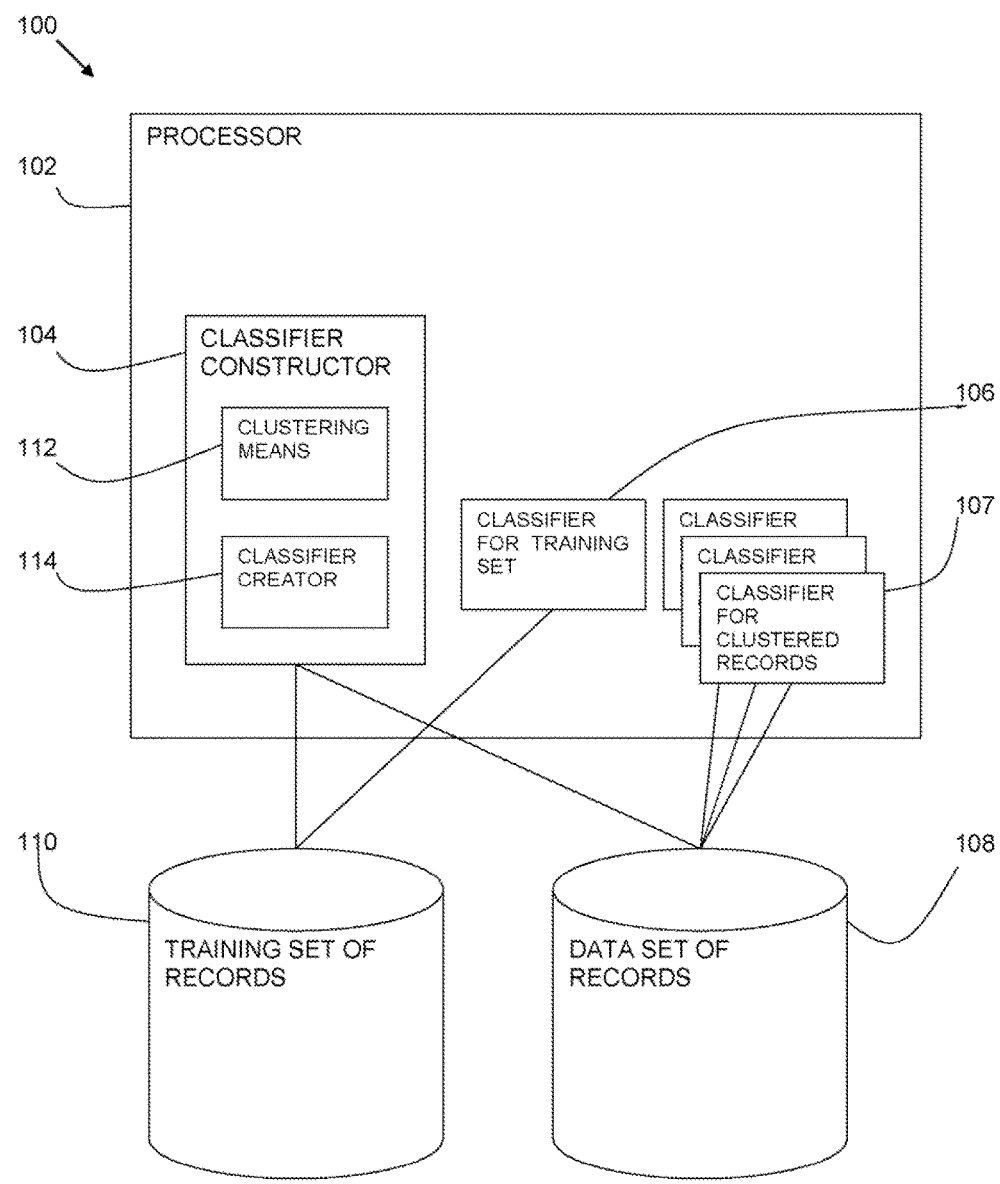
FIG. 1 is a block diagram of a computer system in accordance with the present invention.

Referring to FIG. 1, a computer system 100 is provided including a processor 102. A classifier constructor 104 is provided that may be local to the processor 102 on which it runs or which may be provided remotely via a network such as the Internet. A classifier constructor 104 may be a computer software component, a hardware component or a combination of software and hardware. The classifier constructor 104 constructs one or more classifiers that can classify a data set of records 108 into a set of predicted classes.

A classifier is a learning system that learns one or more sets of relationships that define each of a known set of predicted classes. Examples of known classifiers include decision tree classifiers, Bayesian classifiers, and Support Vector Machines. Any known form of classifier may be used in the implementation of the present invention.

In the embodiment described herein, the classifier constructor 104 references the context in which the classifier is to be applied. The context in which the classifier is to be applied is referenced by using the data set of records to be classified as a reference when constructing the classifier.

The data set of records 108 to be classified may be any form of data set and may be provided local to the processor 102 on which the classifier constructor 104 is provided, for example, as a local database, or may be distributed remotely via a network, for example, as data records distributed across the Internet.

A set of training records 110 is provided that is available at the point at which the classifier is to be used. The set of training records 110 includes examples of known classes that are presented to the classifier that learns the relationships that define the known classes. When the classifier is applied to the data set of records 108 it classifies the data using the learned relationships.

In the described embodiment, the classifier constructor 104 includes a clustering means 112 and a classifier creator 114. The clustering means 112 is applied to the data set of records 108 that are to be classified. This is not the set of training records 110, but the actual data for classification.

The clustering means organises the records into separate groups or clusters such that the records within a group or cluster are similar to each other and dissimilar to the records in other groups or clusters. The clustering means seeks to maximise the similarity within a cluster and the dissimilarity between clusters to determine the actual number of clusters. Examples of known clustering methods include K-means, fuzzy C-means, hierarchical and mixture of Gaussians.

The classifier creator 114 creates a training classifier 106 based on the clusters generated by the clustering means 112. The training classifier 106 thus created is then applied to the set of training records 110. Further classifiers 107 are then created for classifying in the predicted classes, each of the clusters of records in the data set of records 108

Figure 2:
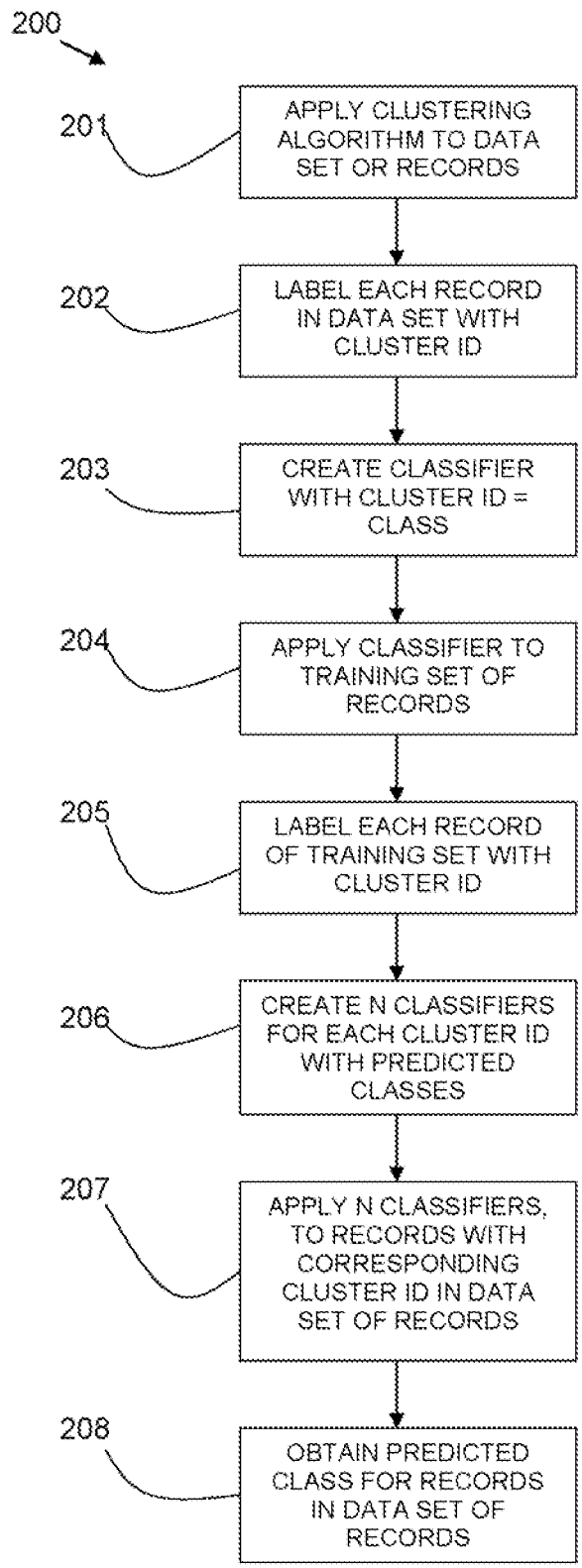
FIG. 2 is a flow diagram of a method of constructing a classifier in accordance with the present invention.

The process of the classifier constructor 104 is now described with reference to FIG. 2 that shows a flow diagram 200 of the method of constructing a classifier.

Apply a clustering algorithm 201 to the data set of records to be classified. The records are clustered to determine if they are sufficiently similar to be representative of the same class. Label each record 202 with a cluster identifier.

Create a training classifier 203 that can classify records into the clusters using the cluster identifier as the class. This training classifier will automatically select the best features to discriminate between the different classes under the conditions in which they are to be discriminated.

Apply the resulting training classifier 204 to a set of training records and label 205 each record with the predicted cluster identifier.

For all records in the training set with the same cluster identifier, create 206 a new classifier using the classification of the training records as the predicted class (i e. the required classes). This will result in N classifiers where N is the number of clusters from the first step of the method.

Apply the new classifiers 207 to the records from the data set of records with corresponding cluster identifier. The predicted class label is the required classification 208.

In the limiting case, the resulting classification can be no worse than that built from the training examples alone and in most cases is significantly improved.

Figure 3:
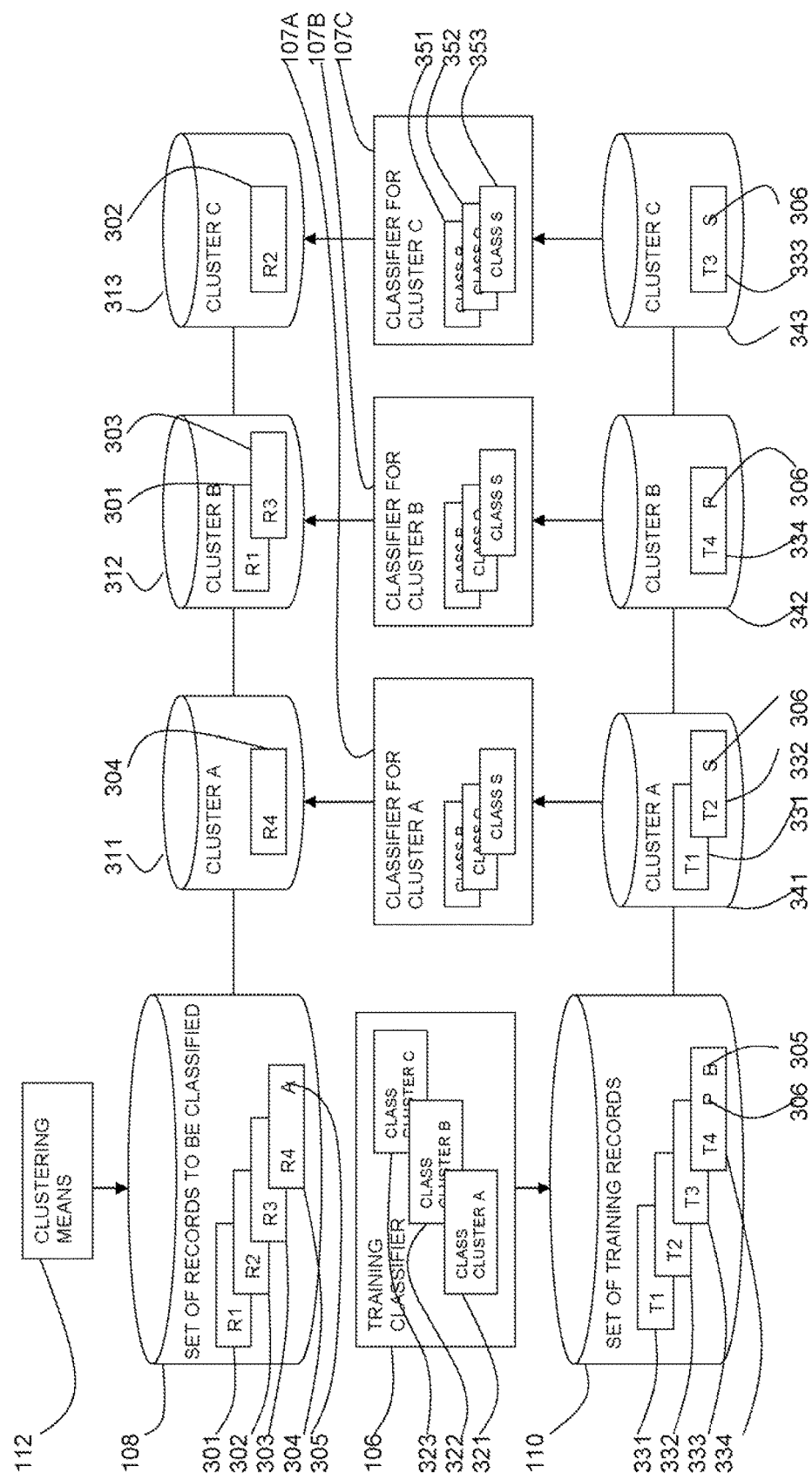
FIG. 3 is a schematic diagram showing the record components in accordance with the present invention.

FIG. 3 illustrates the process showing the components of FIG. 1. The clustering means 112 is applied to the data set of records 108 and each record R1 301, R2 302, R3 303, R4 304 is labeled with a cluster identifier 305. In the simplified example illustrated in FIG. 3, there are three clusters that have cluster identifiers A, B, C. The data set of records 108 has subsets of records 311, 312, 313 in each of the clusters. In this example, record R4 304 is in sub-set 311 for cluster A, records R1 301 and R3 303 are in sub-set 312 for cluster B, and record R2 302 is in sub-set 313 for cluster C.

Training classifier 106 is created to classify records into the clusters A, B, C using the cluster identifier 305 as the class 321, 322, 323. In this example, there are three classes 321, 322, 323 corresponding to the three clusters A, B, C.

The training classifier 106 is applied to the set of training records 110 and classifies the training records T1 331, T2 332, T3 333, T4 334 into the classes 321, 322, 323 corresponding to the three clusters A, B, C and labels each record 331, 332, 333, 334 with the cluster identifier 305. Each of the training records T1 331, T2 332, T3 333, T4 334 has a classification 306 for a final predicted class P 351, Q 352. S 353.

The set of training records 110 has sub-sets of records 341, 342, 343 classified in each of the clusters A, B, C. In this example, records T1 331 and T2 332 are in sub-set 341 for cluster A, record T4 334 is in sub-set 342 for cluster B, and record T3 is in sub-set 343 for cluster C.

For each sub-set 341, 342, 343 of the set of training records 110 with the same cluster identifier 305, a new classifier 107A, 1078, 107C is created, Each of the new classifiers 107A, 1076, 107C classifies records into predicted classes P 351, Q 352, S 353 using the learned classification 306 of the training records 331-334.

The new classifiers 107A, 1076, 1070 are applied to the corresponding sub-set 311, 312, 313 of the data set of records 108 for the cluster A, B or C. In this way, each sub-set 311, 312, 313 of the data set of records 108 is classified into the predicted classes 351, 352, 353 using a classifier optimized for the context of the cluster.

Figure 4:
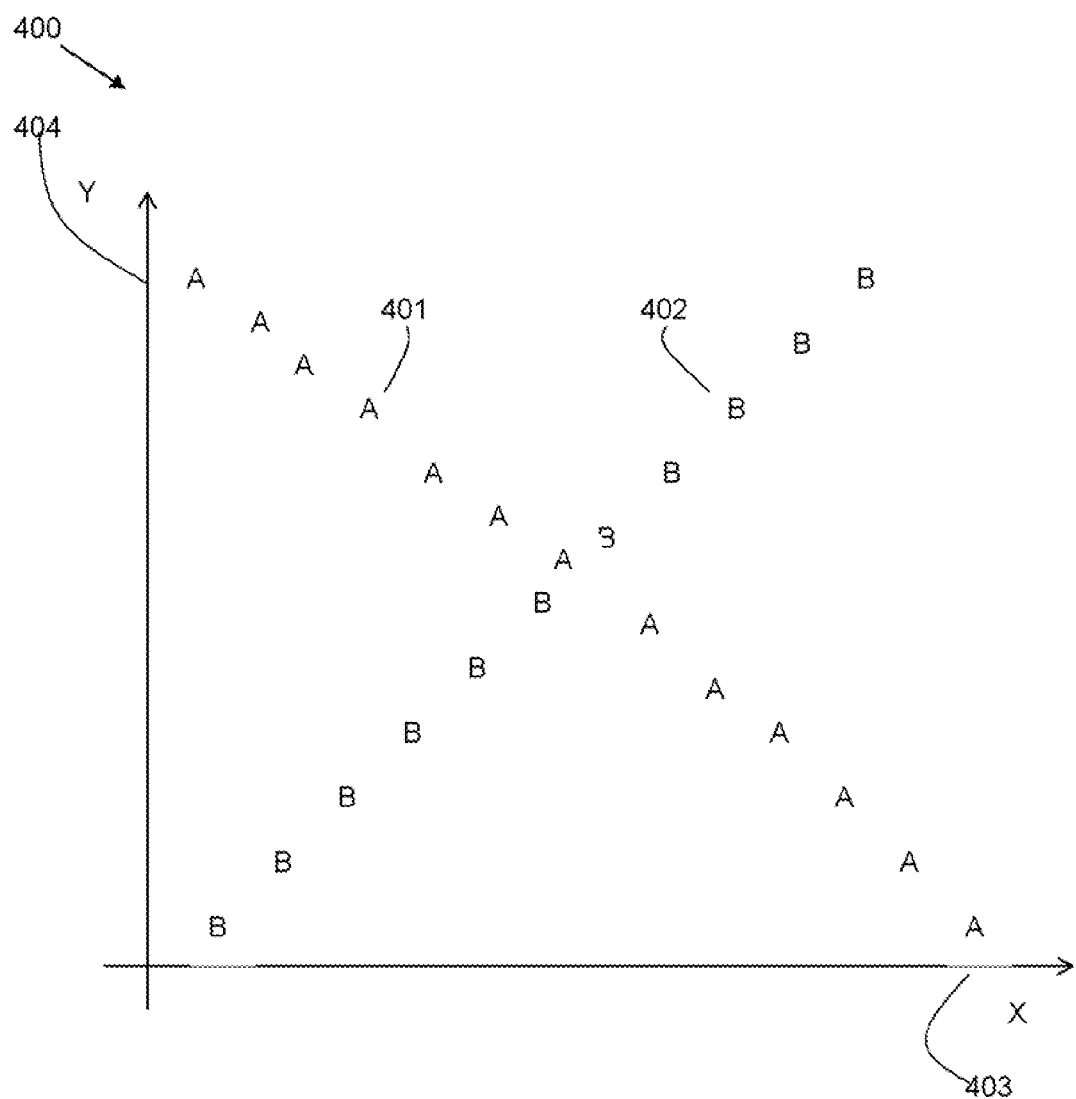
FIG. 4 is an illustration of a worked example in accordance with the present invention.

A worked example is now provided with reference to FIG. 4 that illustrates a set of training records with two features (X,Y). FIG. 4 shows a graph 400 with the training records 401, 402 plotted with values of a first feature X along the x-axis 403 and the values of a second feature Y along the y-axis 404. The training records 401, 402 belong to two classes A 401 and B 402.

In a practical example, the two classes A and B could represent two categories of vehicle (for example, poor and good) and the two features X, Y could represent speed and fuel efficiency.

A decision tree classifier, such as that used in the DB2 Intelligent Miner product (DB2 and Intelligent Miner are trade marks of International Business Machines Corporation), will not be able to discriminate between the two classes A, B since neither feature X or feature Y provides an obvious boundary condition that can divide the two classes of object.

This is indicated by the confusion matrix shown in Table 1 below for the corresponding decision tree.
Class Data test
Number of classes=2
Errors=10 (50%)

TABLE 1

Confusion matrix for pruned tree all values of X and Y

| Predicted Class | Class A | Class B | |
|---|---|---|---|
| Class A | 10 | 0 | Total = 10 |
| Class B | 10 | 0 | Total = 10 |
| | 20 | 0 | Total = 20 |

If unseen records are generated for high values of Y then these will automatically cluster into two clusters with high (Cluster 1) and low (Cluster 2) values of X. Classifying these two clusters results in a training classifier with the simple boundary conditions;

Y>0.7 Ymax & X>0.5Xmax then Cluster 1 (100%)

Y>0.7 Ymax & X<0.5Xmax then Cluster 2 (100%)

Applying this training classifier to the original set of training records shows that all examples in Cluster 1 are Class A and all in Cluster 2 are Class B. No further classifier is therefore required and the final classifier is Y>0.7 Ymax & X>0.5Xmax then Class A (100%)

Y>0.7 Ymax & X<0.5Xmax then Class B (100%)

Class Data Test
Number of classes=2
Errors=0 (0%)

TABLE 2

Confusion matrix for pruned tree Y > 0.7 Ymax

| Predicted Class | Class A | Class B | |
|---|---|---|---|
| Class A | 4 | 0 | Total = 4 |
| Class B | 0 | 4 | Total = 4 |
| | 4 | 4 | Total = 8 |

The described classifier constructor may be provided as a data mining toolkit in the form of a computer program product. The classifier constructor may also be provided in an embedded system requiring a classifier.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The present invention may be provided as a service to a customer over a network. In particular, the service may construct a classifier for the customer.

Improvements and modifications can be made to the foregoing without departing from the scope of the present invention.

The invention claimed is:

1. A computer-implemented method for constructing a classifier classifying data records into specific categories, comprising:
    a) clustering a set of records that are to be classified into a plurality of clusters of records by applying a clustering process to the set of records that are to be classified;
    b) creating a first classifier based upon the clustered set of records that are to be classified, the first classifier enabled to classify records into a plurality of training clusters;
    c) applying the first classifier to a set of training records to create a plurality of training clusters, each record in each training cluster of the plurality of training clusters having a corresponding predicted class;
    d) creating separate classifiers for each training cluster of the plurality of training clusters; and,
    e) applying one of the created separate classifiers to a corresponding one of the clusters of records amongst the clustered set of records in order to classify the corresponding one of the clusters of records,
    wherein the first classifier and also each separate classifier learns one or more sets of relationships that define each of a known set of predicted classes and wherein the computer-implemented method first processes the set of records that are to be classified to determine a context before using the set of training records to classify the set of records based upon the determined context.

2. The method of claim 1, wherein
step c) classifies the set of training records into the plurality of training clusters.

3. The method of claim 1, wherein
each record of the clustered set of records are labeled with a cluster identifier following step a).

4. The method of claim 3, wherein
each record in each training cluster of the plurality of training clusters are further labeled with the cluster identifier at step c).

5. A computer hardware system for constructing a classifier classifying data records into specific categories, comprising:
    at least one processor, wherein the at least one processor configured to perform:
        clustering a set of records that are to be classified into a plurality of clusters of records by applying a clustering process to the set of records that are to be classified;
        creating a first classifier based upon the clustered set of records that are to be classified, the first classifier enabled to classify records into a plurality of training clusters;
        applying the first classifier to a set of training records to create a plurality of training clusters, each record in each training cluster of the plurality of training clusters having a corresponding predicted class;

creating separate classifiers for each training cluster the plurality of training clusters; and, applying one of the created separate classifiers to a corresponding one of the clusters of records amongst the clustered set of records in order to classify the corresponding one of the clusters of records, and wherein the at least one processor first processes the set of records that are to be classified to determine a context before using the set of training records to classify the set of records based upon the determined context.

6. The system of claim 5, wherein
the first classifier classifies the set of training records into the plurality of training clusters.

7. The system of claim 5, wherein
upon clustering the set of records, each of the clustered set of records are labeled with a cluster identifier.

8. The system of claim 5, wherein
applying the first classifier to the set of training records further comprises labeling each record in each training cluster of the plurality of training clusters with a cluster identifier.

9. A non-transitory computer readable storage medium for constructing a classifier, comprising computer readable instructions, which, when executed on a computer system, cause the computer system to perform the steps of:

a) clustering a set of records that are to be classified into a plurality of clusters of records by applying a clustering process to the set of records that are to be classified;

b) creating a first classifier based upon the clustered set of records that are to be classified, the first classifier enabled to classify records into a plurality of training clusters;

c) applying the first classifier to a set of training records to create a plurality of training clusters, each record in each training cluster of the plurality of training clusters having a corresponding predicted class;

d) creating separate classifiers for each training cluster of the plurality of training clusters; and, e) applying one of the created separate classifiers to a corresponding one of the clusters of records amongst the clustered set of records in order to classify the corresponding one of the clusters of records, wherein the first classifier and also each separate classifier learns one or more sets of relationships that define each of a known set of predicted classes and wherein the computer system first processes the set of records that are to be classified to determine a context before using the set of training records to classify the set of records based upon the determined context.

\* \* \* \* \*